United States Patent
Wang et al.

(10) Patent No.: US 10,773,437 B2
(45) Date of Patent: Sep. 15, 2020

(54) MOLD OF IN-MOLD MOLDING AND EJECTING MECHANISM THEREOF

(71) Applicant: Dongguan Dowell Casting Products Co., Ltd., Dongguan (CN)

(72) Inventors: Wei Wang, Dongguan (CN); Gaofeng Li, Dongguan (CN); Wawa Wong, Dongguan (CN)

(73) Assignee: DONGGUAN DOWELL CASTING PRODUCTS CO., LTD., Dongguan (CN)

( * ) Notice: Subject to any disclaimer, the term of this patent is extended or adjusted under 35 U.S.C. 154(b) by 269 days.

(21) Appl. No.: 15/949,317

(22) Filed: Apr. 10, 2018

(65) Prior Publication Data

US 2018/0222100 A1 Aug. 9, 2018

(30) Foreign Application Priority Data

Nov. 14, 2017 (CN) .......................... 2017 1 1123403

(51) Int. Cl.
*B29C 45/40* (2006.01)
*B29C 45/14* (2006.01)
*B29L 31/46* (2006.01)

(52) U.S. Cl.
CPC ...... *B29C 45/401* (2013.01); *B29C 45/14065* (2013.01); *B29L 2031/463* (2013.01)

(58) Field of Classification Search
CPC . B29C 45/401; B29C 45/14065; B29C 45/40; B29C 2045/4015–4052
See application file for complete search history.

(56) References Cited

U.S. PATENT DOCUMENTS

| 6,537,053 B1* | 3/2003 | Watkins | B29C 43/42 249/68 |
| 2005/0089593 A1* | 4/2005 | Wang | B29C 45/401 425/116 |
| 2011/0293775 A1* | 12/2011 | Pfeifer | B29C 37/001 425/556 |
| 2011/0311665 A1* | 12/2011 | Kimura | B29C 33/442 425/3 |
| 2018/0065287 A1* | 3/2018 | Park | B29C 45/4005 |
| 2018/0142141 A1* | 5/2018 | Xiao | C09K 9/02 |
| 2018/0147763 A1* | 5/2018 | Sorimoto | B29C 45/401 |

* cited by examiner

*Primary Examiner* — Jacob T Minskey
*Assistant Examiner* — Adrien J Bernard
(74) *Attorney, Agent, or Firm* — Shimokaji IP

(57) ABSTRACT

A mold includes a fixed mold, a fixture, a movable mold and an ejecting mechanism including a fixture thimble, a nozzle thimble, an auxiliary thimble, an elastic member and a top plate located in ejecting space and having a limit cavity. The nozzle thimble is extended to the molding cavity, and the auxiliary thimble is adjacent to the nozzle thimble. A first end of the fixture thimble is assembled in the limit cavity, and a second end of the fixture thimble is extended to the slider. The elastic member urges the top plate to slide towards a demolding direction. Due to the elastic member, the top plate obtains an elastic force to drive the nozzle thimble and the auxiliary thimble to retreat and separate from the long handle thereby providing a clearance for removing the fixture together with the product and avoiding scratching the product.

7 Claims, 10 Drawing Sheets

MOLD OF IN-MOLD MOLDING AND EJECTING MECHANISM THEREOF

RELATED APPLICATIONS

This application claims the benefit of priority to Chinese Patent Application No. 201711123403.5 filed on Nov. 14, 2017, which is hereby incorporated by reference in its entirety.

FIELD OF THE INVENTION

The present invention relates to an injection mold, more particularly to a mold of in-mold molding to mold a product with a short handle and a long handle and an ejecting mechanism thereof.

BACKGROUND OF THE INVENTION

In-mold molding is to insert a pre-made mold insert into a molding cavity of an injection mold, then to inject molten material into the molding cavity, so that the molten material and the pre-made mold insert can be formed integrally when the molten material cools down.

As shown in FIG. 1, a product 200 with a long handle and a short handle includes a pre-made short handle 210 and a long handle 220 formed by injection molding. It's not allowed that surfaces of the product 200 are attached with a thimble mark, thus an ejecting mechanism causing the ejected product to be adhered to a movable mold will be defective. In order to prevent the product from adhering to the movable mold in the process of demolding, a new thimble is added to the ejecting mechanism of existing injection mold. But since the new thimble, the fixture and nozzle thimbles are at the same height after the product is ejected, so when the product is removed together with the fixture, the new thimble always scratches the surfaces of the product, resulting in products with a defect rate of 100%.

Thus, there is an urgent need for a mold of in-mold molding that protects product surface from scratching to overcome the above-mentioned drawbacks.

SUMMARY OF THE INVENTION

One objective of the present invention is to provide a mold of in-mold molding that protects product surface from scratching.

To achieve the above objective, a mold of in-mold molding is provided, which is used for molding a product with a pre-made short handle and a long handle extending from a first end of the short handle along a length direction of the product and formed by injection molding. The mold includes a fixed mold, a movable mold, a fixture and an ejecting mechanism. The movable mold includes a mold base plate, a mold pad, a mold core and a slider embedded in or removed from the mold core in a direction parallel to a mold clamping direction, the mold pad is supported between the mold base plate and the mold core, and an ejecting space is defined by the mold pad, the mold base plate and the mold core. The first end of the short handle clamped by the fixture is embedded in or removed from the slider along a direction intersecting with the mold clamping direction, the fixture is clamped by the fixed mold and the mold core after mold clamping, and a second end of the short handle clamped by the fixture is disposed in the molding cavity that is defined by the fixed mold and the movable mold to mold the long handle. Further, the ejecting mechanism includes a fixture thimble, a nozzle thimble, an auxiliary thimble, an elastic member and a top plate which is located in the ejecting space and includes a first top plate and a second top plate stacked on one another in the mold clamping direction, a limit cavity is formed on the second top plate, the fixture thimble, the nozzle thimble and the auxiliary thimble are arranged parallel to the direction of the mold clamping, first ends of the nozzle thimble and the auxiliary thimble are installed on the first and the second the top plates, a second end of the nozzle thimble is extended to the molding cavity, a second end of the auxiliary thimble is extended to the molding cavity and adjacent to the nozzle thimble, a first end of the fixture thimble is assembled in the limit cavity and selectively slides relative to the limiting cavity, a second end of the fixture thimble is extended to the slider, and the elastic member always urges the first and the second top plates to slide towards the mold base plate. Thus, when the fixture thimble, the nozzle thimble and the auxiliary thimble are simultaneously driven by the first and the second top plates to eject the product, the fixture and the slider from the mold core, by means of an elastic force of the first and the second top plates, the nozzle thimble and the auxiliary thimble are retreated relative to the fixture thimble and separated from the long handle, thereby providing a clearance for removing the fixture together with the product from the slider.

Preferably, the mold of in-mold molding further includes a limit bolt arranged along the direction parallel to the mold clamping direction, a first end of the limit bolt is installed on the first top plate, a second end of the limit bolt is protruded from the second top plate in a direction close to the mold core, the elastic member is sleeved on the limit bolt, the mold core has a receiving cavity for receiving the second end of the limit bolt, when the fixture thimble, the nozzle thimble and the auxiliary thimble are simultaneously driven by the first and the second top plates to eject the product, the fixture and the slider from the mold core, and the limit bolt is moved into the receiving cavity to make the elastic member press elastically against the mold core and the first and the second top plates.

Concretely, the first end of the limit bolt is screwed into the first top plate, a movable cavity is defined on the second top plate for elastic deformation of the elastic member, the second end of the limit bolt is protruded from the movable cavity, and the elastic member is located in the movable cavity and extended out of the movable cavity.

Preferably, a sliding direction of the fixture on the slider is perpendicular to the mold clamping direction.

Preferably, the auxiliary thimble is located between the fixture thimble and the nozzle thimble.

Another objective of the present invention is to provide an ejecting mechanism of a mold of in-mold molding that protects product surface from scratching.

An ejecting mechanism of a mold of in-mold molding, which is adapted for molding a product with a pre-made short handle and a long handle extending from a first end of the short handle along a length direction of the product and formed by injection molding, includes a fixture thimble, a nozzle thimble, an auxiliary thimble, an elastic member and a top plate, and the mold has a mold clamping direction and a demolding direction. Specifically, the top plate is located in the ejecting space and includes a first top plate and a second top plate stacked on one another in the mold clamping direction, a limit cavity is formed on the second top plate, the fixture thimble, the nozzle thimble and the auxiliary thimble are arranged parallel to the mold clamping direction, first ends of the nozzle thimble and the auxiliary thimble are installed on the first and the second top plates, a second end of the nozzle thimble is extended to the molding cavity, a second end of the auxiliary thimble is extended to the molding cavity and adjacent to the nozzle thimble, a first end of the fixture thimble is assembled in the limit cavity and selectively slides relative to the limit cavity, and the elastic member urges the first and the second top plates to slide towards a demolding direction.

Preferably, the ejecting mechanism of the mold of in-mold molding further includes a limit bolt arranged along the direction parallel to the mold clamping direction, a first end of the limit bolt is installed on the first top plate, and a second end of the limit bolt is protruded from the second top plate.

Preferably, the first end of the limit bolt is screwed into the first top plate, a movable cavity is defined on the second top plate, the second end of the limit bolt is protruded from the movable cavity, and the elastic member is located in the movable cavity and extended out of the movable cavity.

Preferably, the auxiliary thimble is located between the fixture thimble and the nozzle thimble.

In comparison with the prior art, by means of the auxiliary thimble, the elastic member and the limit cavity on the second top plate, in the demolding process of the product, the fixture thimble, the nozzle thimble and the auxiliary thimble are simultaneously driven by the first and the second top plates to eject the product, the fixture and the slider from the mold core. Meanwhile, the nozzle thimble and the auxiliary thimble are retreated relative to the fixture thimble due to the elastic force of the first and the second top plates; that's because the fixture thimble is stopped temporarily in the limit cavity in the second top plate thereby making the nozzle thimble and the auxiliary thimble separate from the long handle, which provides clearance for removing the product. Thus, when operator removes the fixture together with the product from the slider along a direction intersecting with the mold clamping direction, the nozzle thimble and the auxiliary thimble is separated from the long handle, which provides a clearance for removing the fixture together with the product from the slider and avoids scratching the surfaces of the product.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
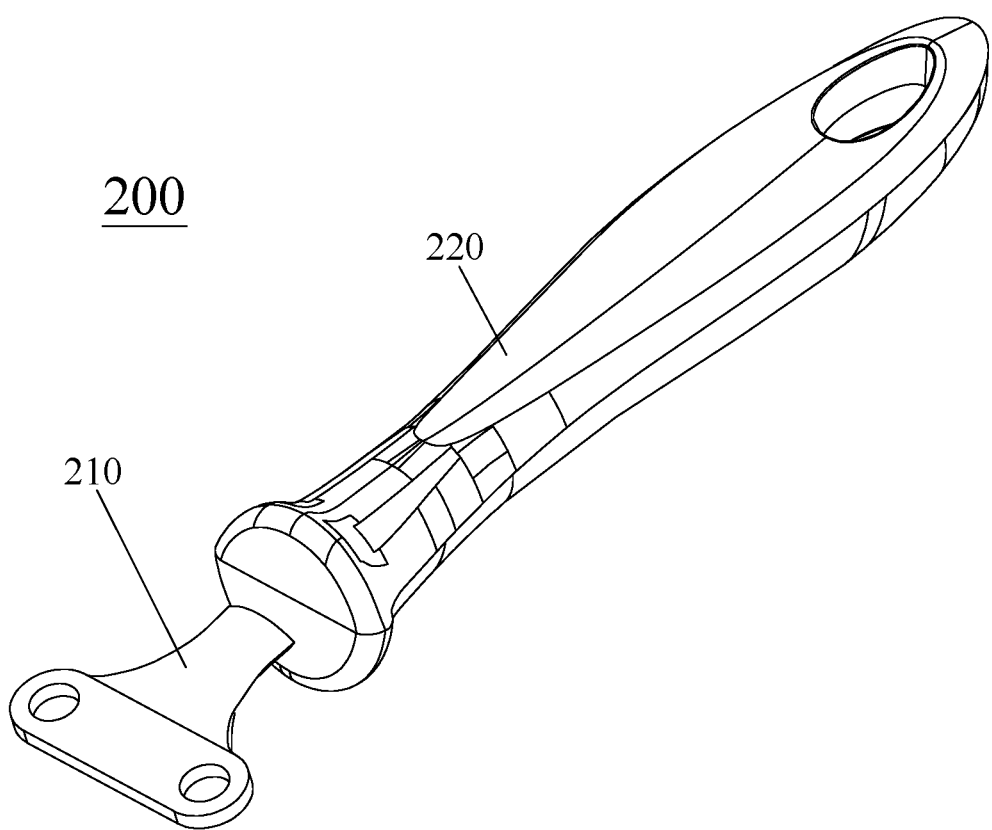
FIG. 1 is a perspective view of a product with a long handle and a short handle.

The present invention will be described with reference to the accompanying drawings, in which like reference numerals refer to similar elements.

Figure 2:
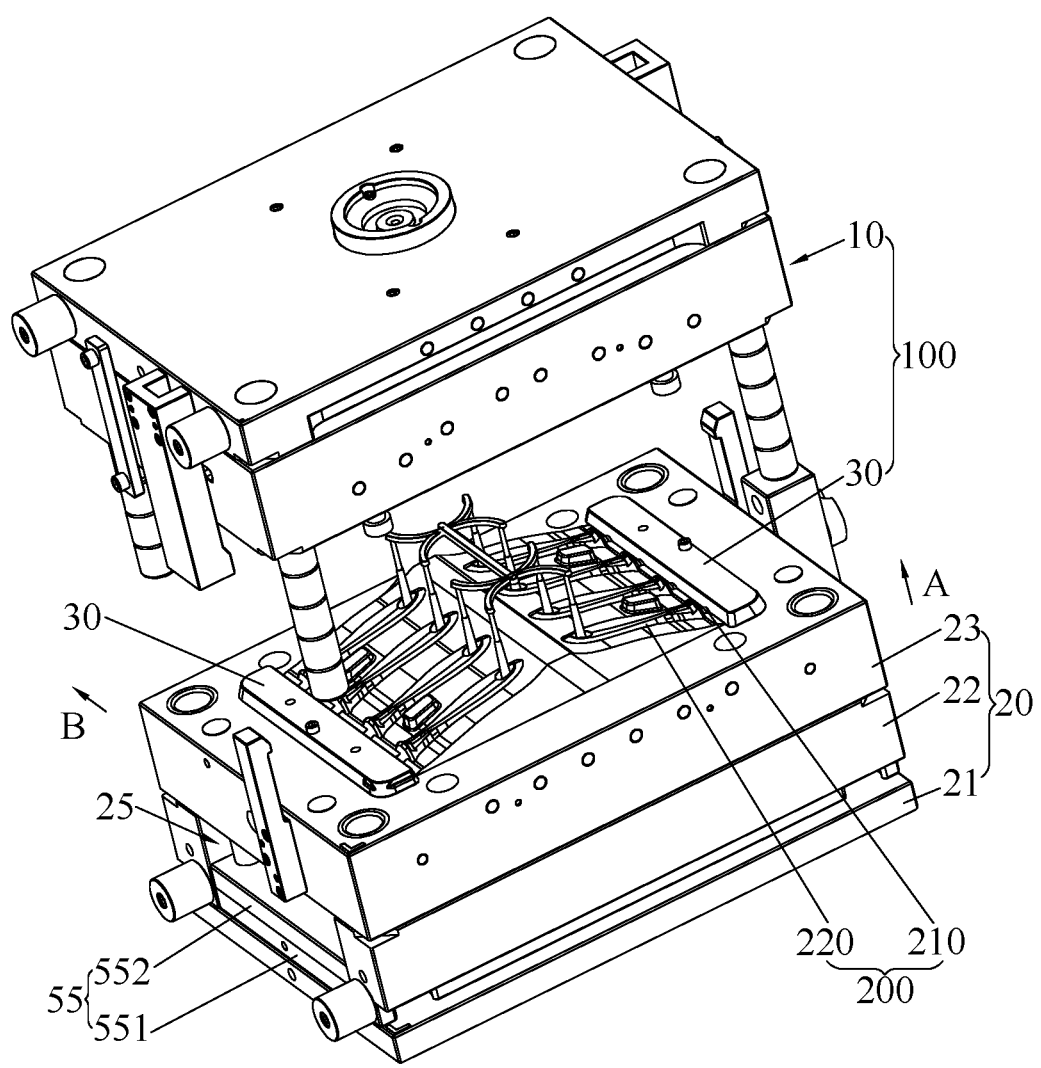
FIG. 2 is a perspective view of a mold of in-mold molding before mold clamping according to one embodiment of the present invention.
Figure 3:
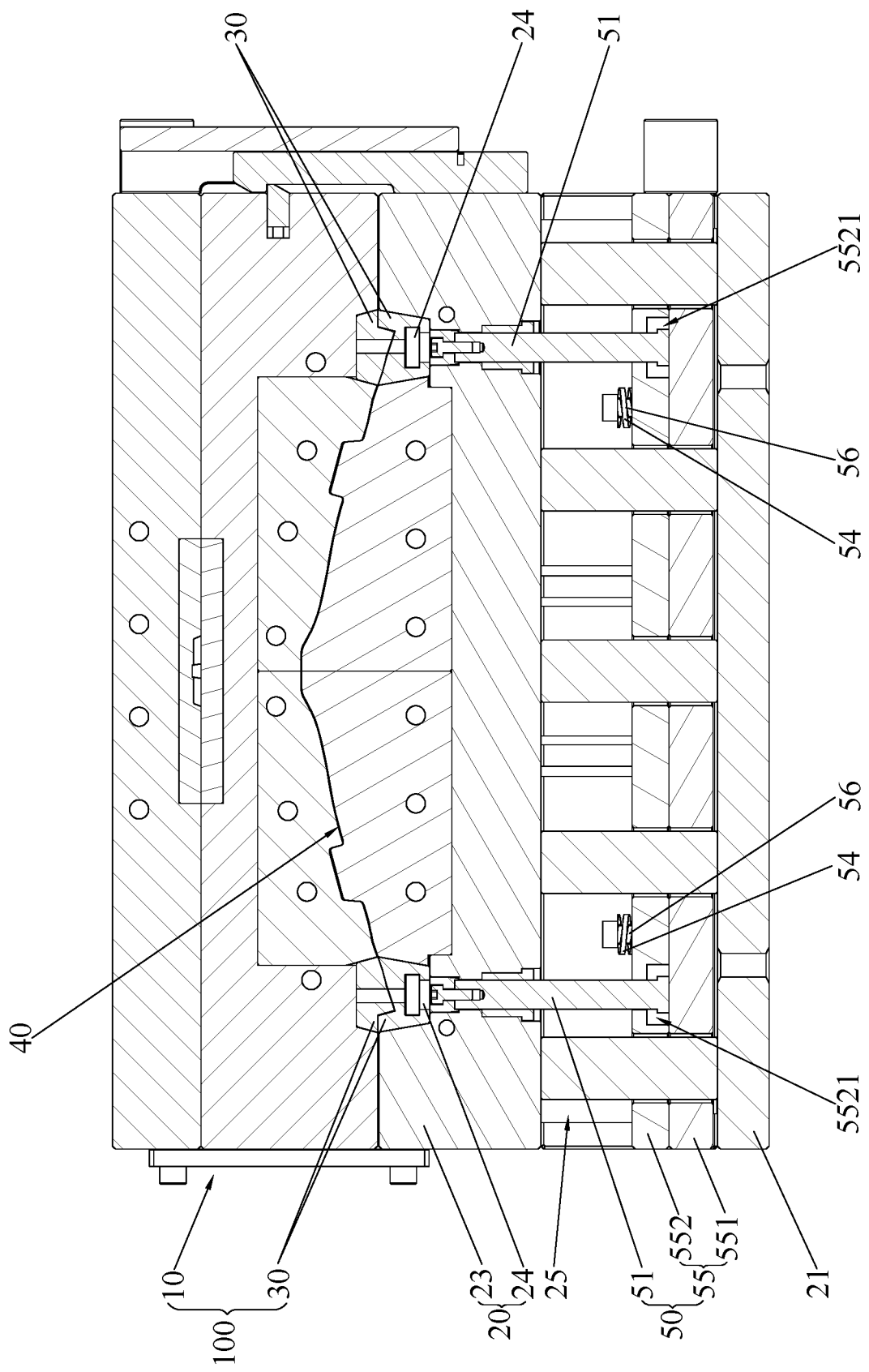
FIG. 3 is an internal structure view of the mold of in-mold molding after mold clamping.
Figure 4:
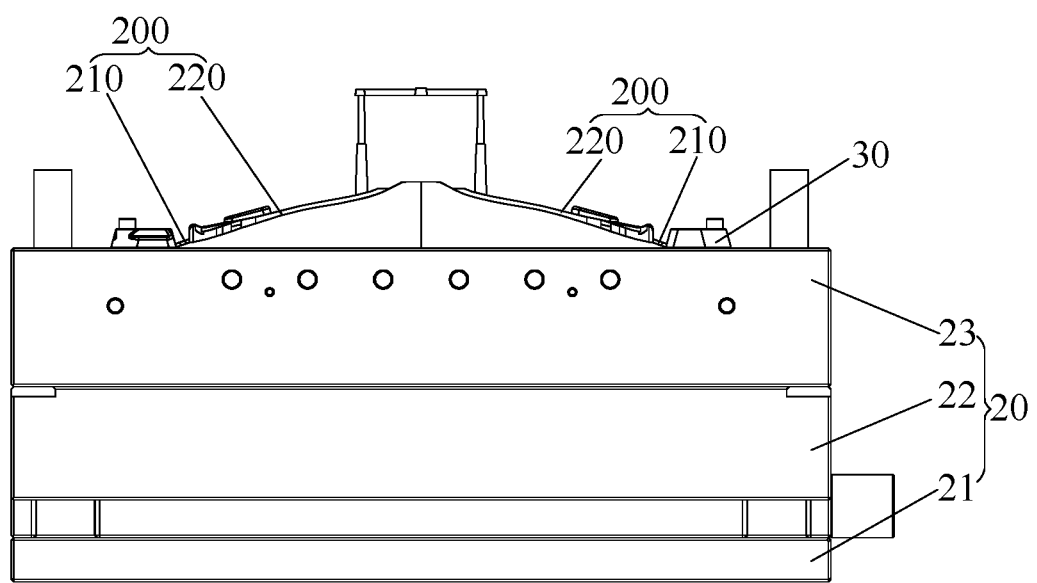
FIG. 4 is a front elevational view of the mold of in-mold molding with a fixed mold hidden and the product not ejected by an ejecting mechanism.

Referring to FIG. 1 through FIG. 3, a mold of in-mold molding 100 is used for molding a product 200 with a long handle and a short handle. As shown in FIG. 1, the product 200 includes a pre-made short handle 210 and a long handle 220 extending from a first end of the short handle 210 along a length direction of the product 200 and formed by injection molding. A second end of the short handle 210 is inserted the long handle 220 and formed integrally.

Concretely, the mold of in-mold molding 100 includes a fixed mold 10, a fixture 30, a movable mold 20 and an ejecting mechanism 50, and the movable mold 20 includes a mold base plate 21, a mold pad 22, a mold core 23 and a slider 24 embedded in or removed from the mold core 23 in a direction parallel to a mold clamping direction. Concretely, the mold base plate 21, the mold pad 22 and the mold core 23 are stacked on one another in the mold clamping direction (as indicated by the arrow A in FIG. 2), the mold pad 22 is supported between the mold base plate 21 and the mold core 23, and an ejecting space 25 is defined by the mold pad 22, the mold base plate 21 and the mold core 23. A first end of the short handle 210 clamped by the fixture 30 is embedded in or removed from the slider 24 along a direction intersecting with the mold clamping direction (as indicated by the arrow B in FIG. 2). Preferably, a sliding direction of the fixture 30 on the slider 24 is perpendicular to the mold clamping direction, so that the fixture 30 together with the product 200 is removed from the slider 24. The fixture 30 is clamped between the fixed mold 10 and the mold core 23 after mold clamping, as shown in FIG. 3, and a molding cavity 40 is defined by the fixed mold 10 and the movable mold 23. Meanwhile a second end of the short handle 210 clamped by the fixture 30 is disposed in the molding cavity 40, so that the short handle 210 and the long handle 220 is formed integrally.

Figure 9:
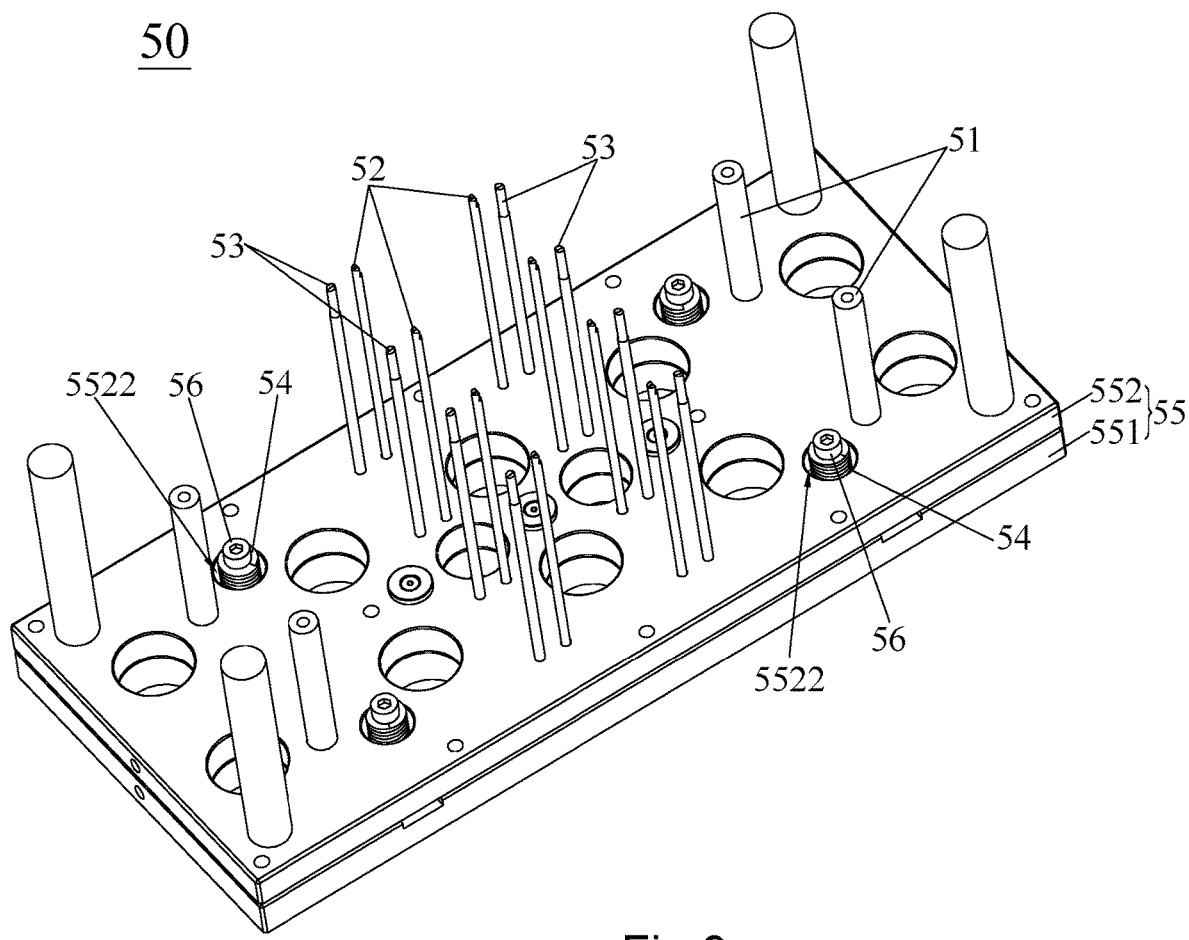
FIG. 9 is a perspective view of the ejecting mechanism of the mold of in-mold molding.
Figure 10:
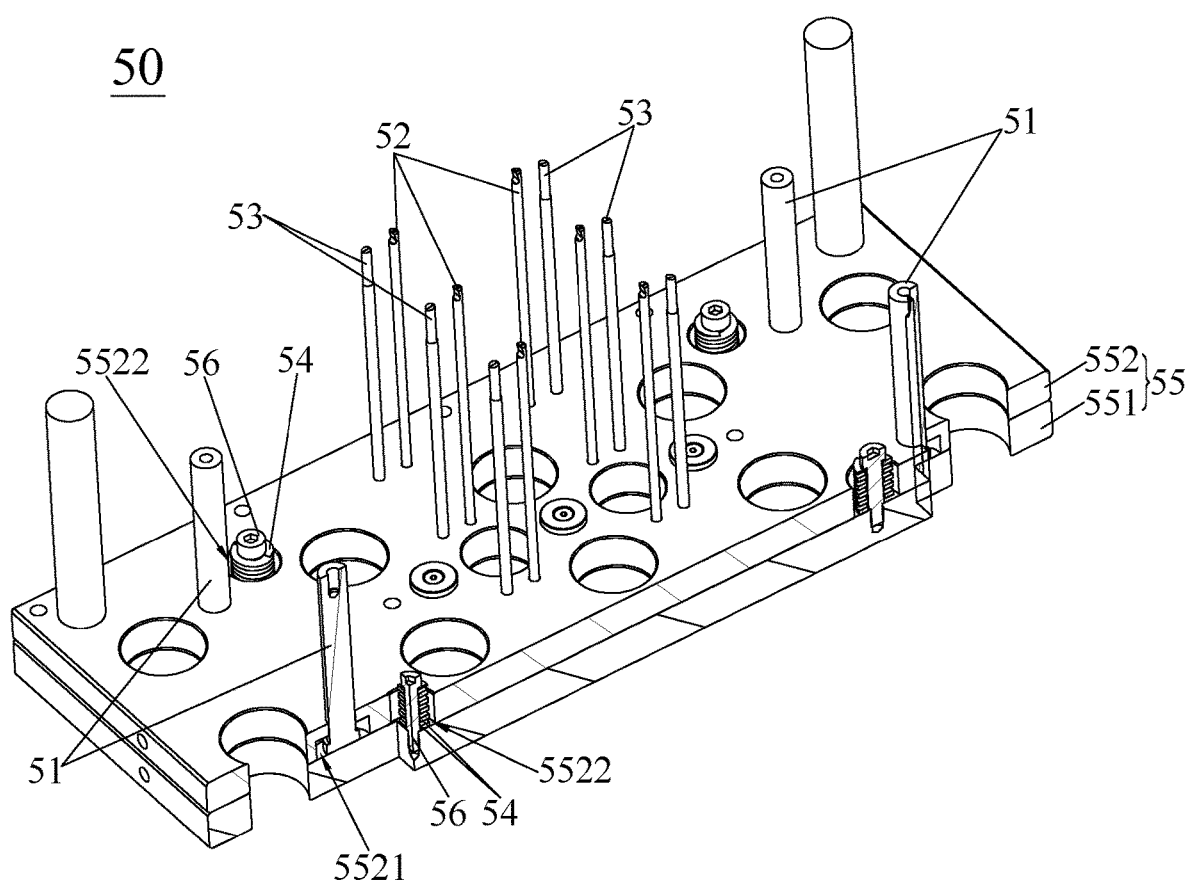
FIG. 10 is a cross section view of a ladder of the ejecting mechanism.

Referring now to FIG. 9 and FIG. 10, the ejecting mechanism 50 includes a fixture thimble 51, a nozzle thimble 52, an auxiliary thimble 53, an elastic member 54 and a top plate 55. Concretely, the top plate 55 is located in the ejecting space 25 and includes a first top plate 551 and a second top plate 552 stacked on one another in the mold clamping direction. A limit cavity 5521 is formed on the second top plate 552. Preferably, the first top plate 551 and the second top plate 552 are welded or fastened together by a screw, but the fixed way not limited to it. The fixture thimble 51, the nozzle thimble 52 and the auxiliary thimble 53 are arranged parallel to the direction of the mold clamping. First ends of the nozzle thimble 52 and the auxiliary thimble 53 are installed on the first top plate 551 and the second top plate 552, and a second end of the nozzle thimble 52 is extended to a molding cavity 40 and opposite to the mold gate, so that the nozzle thimble 52 ejects and breaks freezing material at the outlet. A second end of the auxiliary thimble 53 is extended to the mold cavity 40 and adjacent to the nozzle thimble 52. Preferably, the auxiliary thimble 53 is located between the fixture thimble 51 and the nozzle thimble 52 in the length direction of the product 200, so that thimble imprint on the surface of the long handle 220 is effectively reduced improving quality of the production 200. A first end of the fixture thimble 51 is assembled in the limit cavity 5521 and selectively slides relative to the limiting cavity 5521 according to the preset distance such as 5 mm, 6 mm, 7 mm or 8 mm, which is selected according to actual situation. A second end of the fixture thimble 51 is extended to the slider 24 then to eject the slider 24 from the mold core 23 when demolding. The elastic member 54 always urges the first top plate 551 and the second top plate 552 to slide towards the mold base plate 21.

Figure 5:
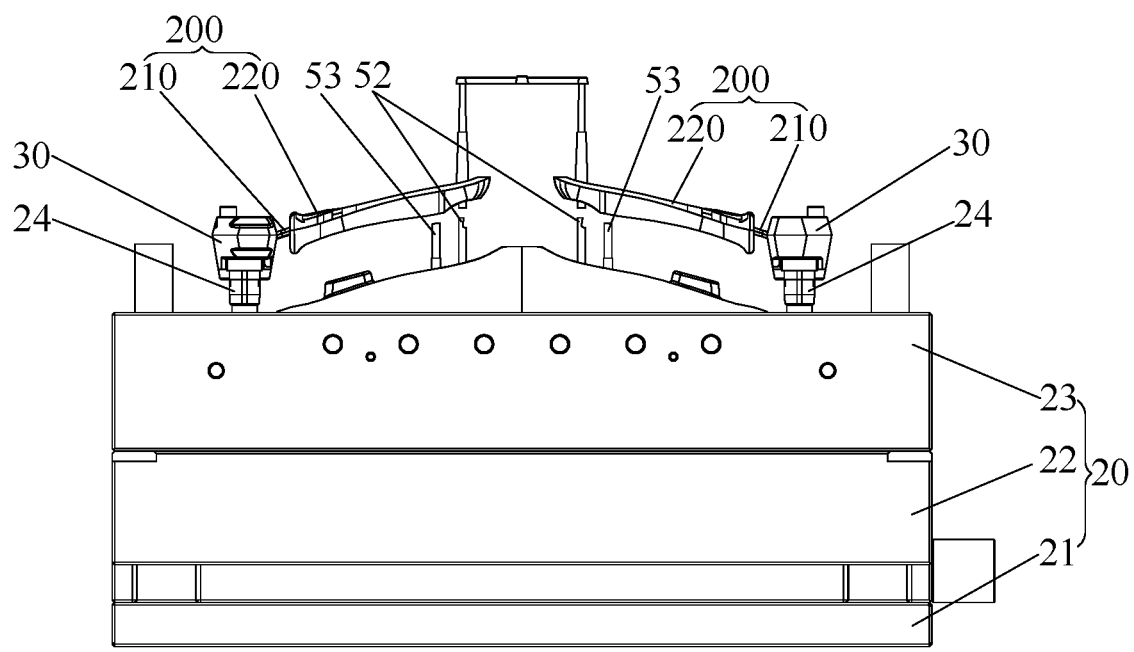
FIG. 5 is a front elevational view of the mold of in-mold molding with the fixed mold hidden and the product ejected by the ejecting mechanism.
Figure 6:
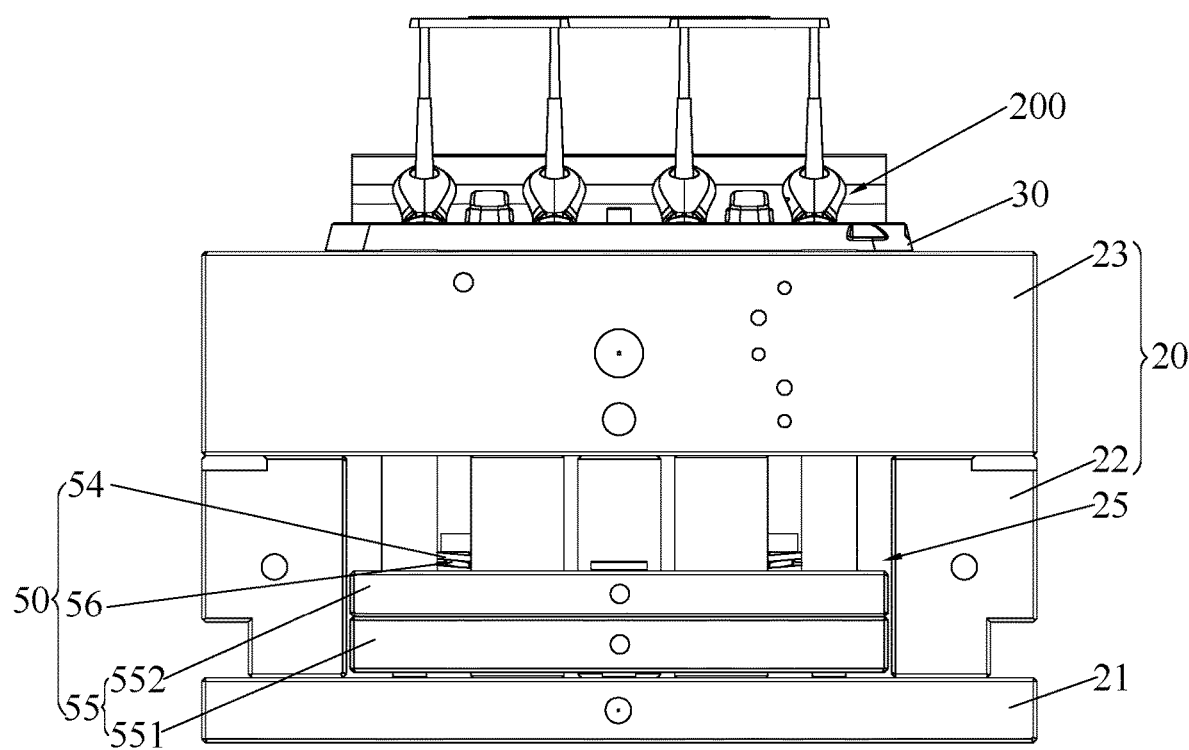
FIG. 6 is a right side elevational view of the mold of in-mold molding with the fixed mold hidden and the product not ejected by the ejecting mechanism.
Figure 7:
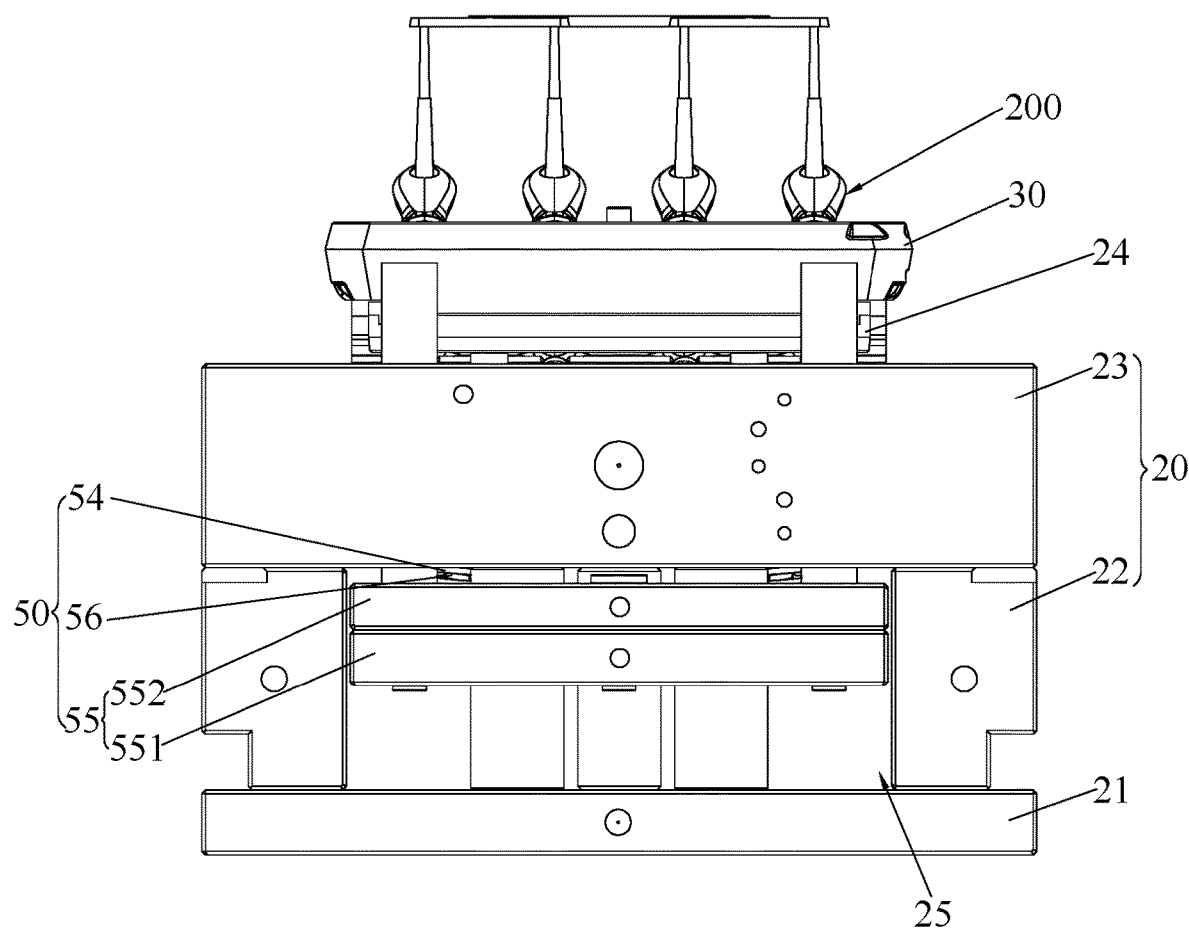
FIG. 7 is a right side elevational view of the mold of in-mold molding with the fixed mold hidden and the product ejected by the ejecting mechanism.
Figure 8:
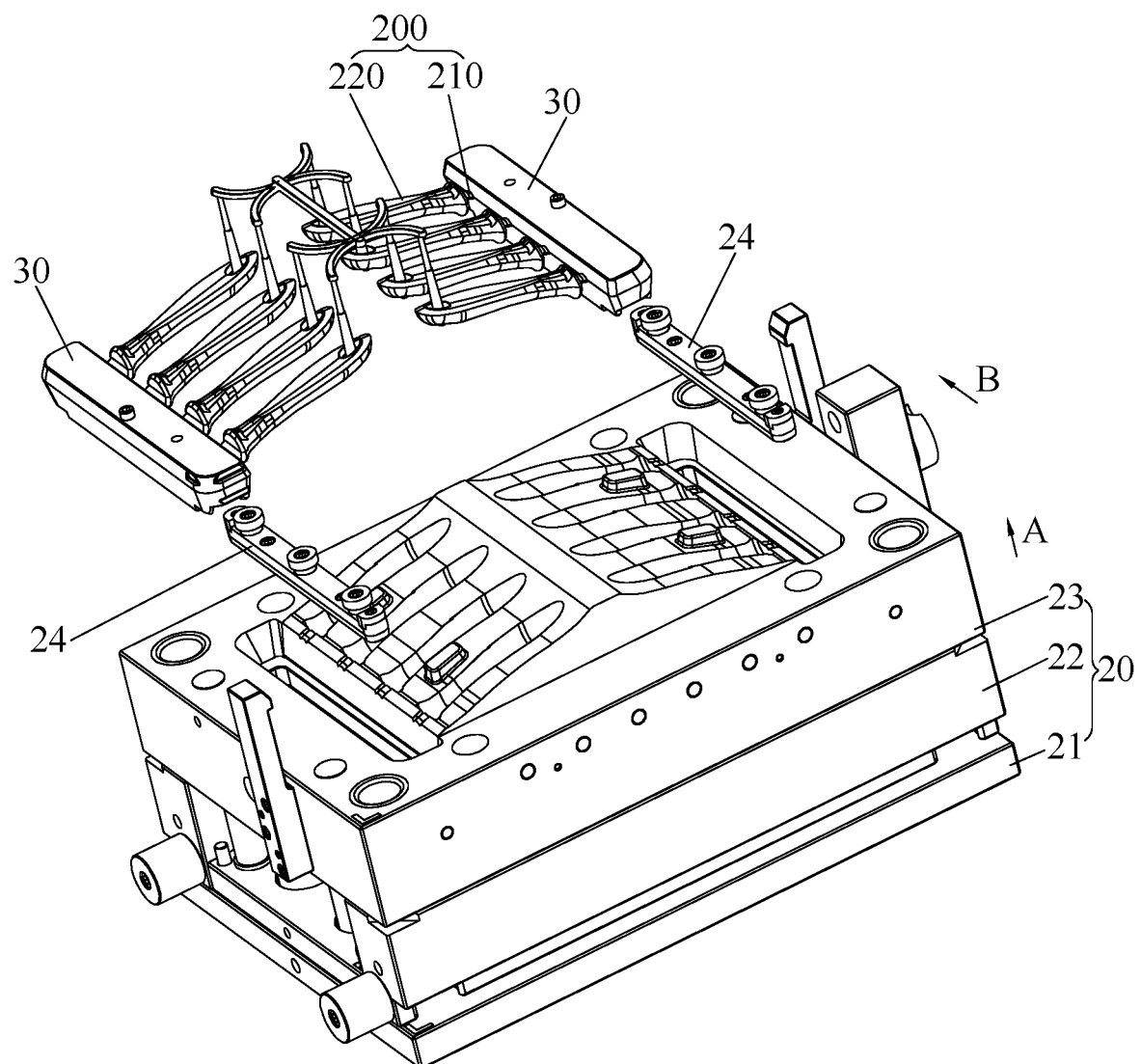
FIG. 8 is a perspective view of the mold of in-mold molding with the fixed mold hidden and the product ejected by the ejecting mechanism.

As shown in FIG. 4 through FIG. 8, in the demolding process of the product 200, when ejector rob of the injection molding machine pushes the first top plate 551 and the second top plate 552 to move towards the mold core 23, the fixture thimble 51, the nozzle thimble 52 and the auxiliary thimble 53 are simultaneously driven by the first top plate 551 and the second top plate 552 to eject the product 200, the fixture 30 and the slider 24 from the mold core 23. By means of the elastic member 54, the top plate 55 obtains an elastic force that slides towards the mold base plate 21. Thus, the first top plate 551 and the second top plate 552 drive the nozzle thimble 52 and the auxiliary thimble 53 to retreat relative to the fixture thimble 51 and separate from the long handle 220, as shown in FIG. 5. Thus, the fixture 30 is removed from the slider 24, namely, the fixture 30 together with the product 200 is removed from the slider 24 along a direction intersecting with the mold clamping direction, and the nozzle thimble 52 and the auxiliary thimble 53 will not scratch surface of the product 200. More specifically, as follows:

As shown in FIG. 3, FIGS. 6-7 and FIGS. 9-10, in this embodiment, the ejecting mechanism 50 further includes a limit bolt 56 arranged along the direction parallel to the mold clamping, and a first end of the limit bolt is installed on the first top plate 551. Preferably, the first end of the limit bolt 56 is screwed into the first top plate 551, a second end of the limit bolt 56 is protruded from the second top plate 552 in the direction close to the mold core 23, the elastic member 54 is sleeved on the limit bolt 56, and the mold core 23 has a receiving cavity for receiving the second end of the limit bolt 56 (not shown). Thus, while the fixture thimble 51, the nozzle thimble 52 and the auxiliary thimble 53 are simultaneously driven by the first top plate 551 and the second top plate 552 to eject the product 200, the fixture 30 and the slider 24 from the mold core 23, the limit bolt 56 is moved into the receiving cavity to make the elastic member 54 press elastically against the mold core 23, the first top plate 551 and second top plate 552 to generate an elastic force. Thus, by means of an elastic force of the first top plate 551 and the second top plate 552, the nozzle thimble 52 and the auxiliary thimble 53 are retreated according to the preset distance after the product 200 is ejected in place, but, the fixture thimble 51 is stopped temporarily in the limit cavity 5521. And the preset distance can be such as 6 mm, 7 mm, or 8 mm. Concretely, a movable cavity 5522 is defined on the second top plate 552 for elastic deformation of the elastic member 54, the second end of the limit bolt 56 is protruded from the movable cavity 5522, and the elastic member 54 is located in the movable cavity 5522 and extended out of the movable cavity 5522. Preferably, the elastic member 54 is a compression spring, but not limited thereto. For example, the fixture thimble 51, the nozzle thimble 52 and the auxiliary thimble 53 are T-shaped bars, that is, the first end of the fixture thimble 51, the nozzle thimble 52 and the auxiliary thimble 53 have a T-shaped head so as to prevent the fixture thimble 51 from sliding out of the limit cavity 5521 in a direction parallel to the mold clamping direction. Similarly, by means of the T-shaped head, the nozzle thimble 52 and the auxiliary thimble 53 are fixed between the first top plate 551 and the second top plate 552, but not limited thereto. In the same way, in other embodiments, the elastic member 54 may be an extension spring connected to the top plate 55 and the movable mold 20, so that the tension spring can drive the top plate 55 back according to a preset distance thereby making the nozzle thimble 52 and the auxiliary thimble 53 retract by the preset distance relative to the fixture thimble 51 and separate from the long handle 220, when the top plate 55 ejects the product 200 into place.

In comparison with the prior art, by means of the auxiliary thimble 53, the elastic member 54 and the limit cavity 5521 on the second top plate 552, in the demolding process of the product 200, the fixture thimble 51, the ejector thimble 52 and the auxiliary thimble 53 are simultaneously driven by the first top plate 551 and the second top plate 552 to eject the product 200, the fixture 30 and the slider 24 from the mold core 23. Meanwhile, the nozzle thimble 52 and the auxiliary thimble 53 are retreated relative to the fixture thimble 51 due to the elastic force of the first top plate 551 and the second top plate 552; that is because the fixture thimble 51 is stopped temporarily in the limit cavity 5521 in the second top plate 552 thereby making the nozzle thimble 52 and the auxiliary thimble 53 separate from the long handle 220, which provides clearance for removing the product 200. Thus, when operator removes the fixture 30 together with the product 200 from the slider 24 along a direction intersecting with the mold clamping direction, the nozzle thimble 52 and the auxiliary thimble 53 are separated from the long handle 220 which provides a clearance for removing the fixture together with the product from the slider and avoids scratching the surfaces of the product 200.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A mold of in-mold molding, adapted for molding a product with a pre-made short handle and a long handle extending from a first end of the short handle along a length direction of the product and formed by injection molding, the mold comprising:
   a fixed mold;
   a movable mold, comprising a mold base plate, a mold pad, a mold core and a slider embedded in or removed from the mold core in a direction parallel to a mold clamping direction, the mold pad being supported between the mold base plate and the mold core, and an ejecting space being defined by the mold pad, the mold base plate and the mold core;
   a fixture, adapted for clamping the first end of the short handle and being embedded in or removed from the slider along a direction intersecting with the mold clamping direction, the fixture being clamped by the fixed mold and the mold core, a second end of the short handle clamped by the fixture being disposed in a molding cavity that is defined by the fixed mold and the movable mold to mold the long handle; and an ejecting mechanism, comprising a fixture thimble, a nozzle thimble, an auxiliary thimble, an elastic member and a top plate;

wherein the top plate is located in the ejecting space and comprises a first top plate and a second top plate stacked on one another in the mold clamping direction, a limit cavity is formed on the second top plate, the fixture thimble, the nozzle thimble and the auxiliary thimble are arranged parallel to the mold clamping direction, first ends of the nozzle thimble and the auxiliary thimble are installed on the first and the second top plates, a second end of the nozzle thimble is extended to the molding cavity, a second end of the auxiliary thimble is extended to the molding cavity and adjacent to the nozzle thimble, a first end of the fixture thimble is assembled in the limit cavity and selectively slides relative to the limit cavity, a second end of the fixture thimble is extended to the slider, the elastic member urges the first and the second top plates to slide towards the mold base plate; when the fixture thimble, the nozzle thimble and the auxiliary thimble are simultaneously driven by the first and the second top plates to eject, both the product, the fixture and the slider from the mold core, an elastic force of the first and the second top plates urges the nozzle thimble and the auxiliary thimble to retreat relative to the fixture thimble and separated from the long handle, thereby providing a clearance for removing the fixture together with the product from the slider; the ejecting mechanism further comprises a limit bolt arranged along the direction parallel to the mold clamping direction, a first end of the limit bolt is installed on the first top plate, a second end of the limit bolt is protruded from the second top plate in a direction close to the mold core, the elastic member is sleeved on the limit bolt, the mold core has a receiving cavity for receiving the second end of the limit bolt, when the product, the fixture and the slider is ejected from the mold core, and the limit bolt is moved into the receiving cavity to make the elastic member press elastically against the mold core and the first and the second top plates.

2. The mold of in-mold molding according to claim 1, wherein the first end of the limit bolt is screwed into the first top plate, a movable cavity is defined on the second top plate, the second end of the limit bolt is protruded from the movable cavity, and the elastic member is located in the movable cavity and extended out of the movable cavity.

3. The mold of in-mold molding according to claim 1, wherein a sliding direction of the fixture on the slider is perpendicular to the mold clamping direction.

4. The mold of in-mold molding according to claim 1, wherein the auxiliary thimble is located between the fixture thimble and the nozzle thimble.

5. An ejecting mechanism of a mold of in-mold molding adapted for molding a product with a pre-made short handle and a long handle extending from a first end of the short handle along a length direction of the product and formed by injection molding, the mold having a molding cavity, a mold clamping direction and a demolding direction, the ejecting mechanism comprising a fixture thimble, a nozzle thimble, an auxiliary thimble, an elastic member and a top plate;

wherein the top plate comprises a first top plate and a second top plate stacked on one another in the mold clamping direction, a limit cavity is formed on the second top plate, the fixture thimble, the nozzle thimble and the auxiliary thimble are arranged parallel to the mold clamping direction, first ends of the nozzle thimble and the auxiliary thimble are installed on the first and the second top plates, a second end of the nozzle thimble is extended to the molding cavity, a second end of the auxiliary thimble is extended to the molding cavity and adjacent to the nozzle thimble, a first end of the fixture thimble is assembled in the limit cavity and selectively slides relative to the limit cavity, and the elastic member urges the first and the second top plates to slide towards the demolding direction, the ejecting mechanism further comprises a limit bolt arranged along the direction parallel to the mold clamping direction, a first end of the limit bolt is installed on the first top plate, and a second end of the limit bolt is protruded from the second top plate.

6. The ejecting mechanism of the mold of in-mold molding according to claim 5, wherein the first end of the limit bolt is screwed into the first top plate, a movable cavity is defined on the second top plate, the second end of the limit bolt is protruded from the movable cavity, and the elastic member is located in the movable cavity and extended out of the movable cavity.

7. The ejecting mechanism of the mold of in-mold molding according to claim 5, wherein the auxiliary thimble is located between the fixture thimble and the nozzle thimble.

* * * * *